(12) United States Patent
Belmonte

(10) Patent No.: US 9,479,390 B2
(45) Date of Patent: Oct. 25, 2016

(54) AUTOMATIC INITIATION OF A RESPONSE ACTION WHEN AN EVENT ASSOCIATED WITH AN ITEM IN TRANSIT IS BASED ON LOGISTICAL NODE SCAN DATA

(71) Applicant: Steve Belmonte, Atascadero, CA (US)

(72) Inventor: Steve Belmonte, Atascadero, CA (US)

(73) Assignee: ACCUZIP, INC., Atascadero, CA (US)

( * ) Notice: Subject to any disclaimer, the term of this patent is extended or adjusted under 35 U.S.C. 154(b) by 0 days.

(21) Appl. No.: 14/079,633

(22) Filed: Nov. 13, 2013

(65) Prior Publication Data

US 2014/0136594 A1 May 15, 2014

Related U.S. Application Data

(60) Provisional application No. 61/726,555, filed on Nov. 14, 2012.

(51) Int. Cl.
| | | |
|---|---|---|
| *H04L 12/24* | (2006.01) | |
| *H04L 12/58* | (2006.01) | |
| *G07B 17/00* | (2006.01) | |
| *G06Q 10/08* | (2012.01) | |
| *G06K 9/00* | (2006.01) | |

(52) U.S. Cl.
CPC ............ *H04L 41/06* (2013.01); *G06K 9/00469* (2013.01); *G06Q 10/0833* (2013.01); *G07B 17/00* (2013.01); *G07B 17/00435* (2013.01); *H04L 51/00* (2013.01); *H04L 51/34* (2013.01)

(58) Field of Classification Search
CPC ....................................................... H04L 41/06
USPC ....................................................... 705/333
See application file for complete search history.

(56) References Cited

U.S. PATENT DOCUMENTS

| | | | |
|---|---|---|---|
| 5,631,827 A | 5/1997 | Nicholls et al. | |
| 6,571,213 B1 | 5/2003 | Altendahl et al. | |
| 7,969,306 B2 | 6/2011 | Ebert et al. | |
| 8,326,637 B2 | 12/2012 | Baldwin et al. | |
| 2003/0097287 A1* | 5/2003 | Franz et al. | 705/8 |
| 2005/0218220 A1* | 10/2005 | Silver et al. | 235/384 |
| 2006/0229895 A1* | 10/2006 | Kodger | G06Q 10/025 |
| | | | 705/333 |
| 2009/0124269 A1* | 5/2009 | Bychkov et al. | 455/466 |
| 2009/0186596 A1* | 7/2009 | Kaltsukis | 455/404.2 |
| 2010/0115536 A1* | 5/2010 | Yasui | 719/327 |
| 2010/0145754 A1* | 6/2010 | Rahman | 705/8 |
| 2011/0119295 A1* | 5/2011 | Zaengle et al. | 707/769 |

(Continued)

FOREIGN PATENT DOCUMENTS

WO         03060752 A1     7/2003

*Primary Examiner* — Allen J Jung
(74) *Attorney, Agent, or Firm* — Raj Abhyanker, P.C.

(57) ABSTRACT

A method includes processing an event data associated with an item in transit between a source location and a destination location based on a scan data of a logistical node between the source location and the destination location. The server determines if the event data associated with the item in transit between the source location and the destination location based on the scan data of the logistical node between the source location and the destination location is associated with a response action defined in a matching table by the multimodal communication server using a processor and a memory. The server automatically initiates the response action when the event data associated with the item in transit between the source location and the destination location based on the scan data of the logistical node between the source location and the destination location is defined in the matching table on the multimodal communication server.

20 Claims, 7 Drawing Sheets

(56) References Cited

U.S. PATENT DOCUMENTS

| | | |
|---|---|---|
| 2011/0161241 A1 | 6/2011 | Jani et al. |
| 2012/0003989 A1* | 1/2012 | Gravino .......... H04M 3/42357 455/456.1 |
| 2013/0297527 A1 | 11/2013 | Luo |

* cited by examiner

AUTOMATIC INITIATION OF A RESPONSE ACTION WHEN AN EVENT ASSOCIATED WITH AN ITEM IN TRANSIT IS BASED ON LOGISTICAL NODE SCAN DATA

CLAIM OF PRIORITY

This disclosure claims priority to, and incorporates herein by reference the entire specification of U.S. Provisional Patent application No. 61/726,555 filed Nov. 14, 2012 and titled TRIGGER ACTIVATION BY WAY OF A SCAN OF A MAIL PIECE.

FIELD OF TECHNOLOGY

This disclosure relates generally to multimodal communication server and, more particularly, to a method, a device and/or a system of automatic initiation of a response action when an event associated with an item in transit is based on logistical node scan data.

BACKGROUND

An item in transit (e.g., a letter, a package, a pallet, a perishable item, a non-perishable item, a medical product) may travel through a system outside a control of a sender (e.g., a seller) and a recipient (e.g., a customer) of the item in transit. For example, the sender may use a mailing center (e.g., a third party logistics provider) to prepare a number of items to be sent to a group of recipients. A carrier (e.g., the United States Postal Service®, United Parcel Service®, FedEx®) may route the item in transit through a series of logistical nodes (e.g., intermediate locations between a location of the sender and a location of the recipient).

The recipient may get upset when things they order arrive late or damaged. The sender may be blamed for mistakes made by the mailing center and/or the carrier. The recipient may not contact the sender to explain what happened. Further, a confirmation notice associated with the item in transit may seem impersonal. Therefore, the recipient may discard the confirmation notice.

The recipient may not be able to track a present location of the item in transit. Even when the mailing center provides a tracking code associated with the item in transit, the tracking code may not be easily discoverable by the recipient (e.g., may be buried in emails). In some situations, the recipient may forget that the item in transit is to be received. As a result, the recipient may not be available to receive the item in transit when it arrives. This may cause the item in transit to be lost, damaged (e.g., by encountering bad weather), and/or stolen. Therefore, the sender may lose a valuable opportunity to build a relationship with the recipient as the item in transit moves from the sender to the recipient through the carrier. Therefore, the recipient may lose trust in the sender. As a result, valuable current and future revenue opportunities between the sender and the recipient may be lost.

SUMMARY

Disclosed are a method, a device and/or a system of initiation of a response action when an event data associated with an item in transit between a source location and a destination location based on a scan data of a logistical node between the source location and the destination location is defined in a matching table of a multimodal communication server.

In one aspect, a method of a multimodal communication server includes processing an event data associated with an item in transit between a source location and a destination location based on a scan data of a logistical node between the source location and the destination location. The method determines if the event data associated with the item in transit between the source location and the destination location based on the scan data of the logistical node between the source location and the destination location is associated with a response action defined in a matching table by the multimodal communication server using a processor and a memory. In addition, the method automatically initiates the response action when the event data associated with the item in transit between the source location and the destination location based on the scan data of the logistical node between the source location and the destination location is defined in the matching table on the multimodal communication server.

The method may process a serial number and/or a destination data from the scan data. A set of items of a mailing center may be associated based on the serial number. A recipient may be associated based on the destination data and/or the serial number. A response data may be modified based on an action of the mailing center having partitioned access to a record of the matching table associated with the serial number and/or the destination data. An origin data may be processed from the scan data. A sender may be associated based on the origin data and/or the serial number. The response data may be modified based on another action of the sender having partitioned access to the record of the matching table associated with the serial number and/or the destination data.

The serial number may identify a mailing center name, a mailing group name, a mailing center location, and/or a time stamp of the item in transit. The origin data may identify a sender name, a sender zip code, a sender's city, and/or a sender address. The destination data may identify a recipient name, a recipient zip code, a recipient city, and/or a recipient address. The item in transit may include a Quick Response (QR) code printed on a packaging of the item in transit that is automatically associated with a different response action, wherein the different response action is a uniform resource locator (URL) address associated with a promotional message, a multimedia file, an automatic dialing of the sender, and/or an automatic dialing of the mailing center.

The scan data of the logistical node between the source location and/or the destination location may include an initial scan at the source location and/or a final scan at the destination location. A telephonic communication may be established between the recipient and/or the sender based on the response action associated with the event data. A text message communicated to the recipient on behalf of the mailing center and/or the sender may be generated based on the response action associated with the event data. A stored multimedia data may be communicated to the recipient, the sender, and/or the mailing center based on the response action associated with the event data. The text message may be an arrival notification, an elapsed-time notification, a time-remaining notification, a status notification, an item condition notification, a temperature notification, a moisture reading, a weather notification, and/or a custom notification generated by the sender and/or the mailing center based on the response action associated with the event data.

The stored multimedia data may be an audio file, a video file, an electronic document, email content, and/or a custom multimedia data generated by the sender and/or the mailing center based on the response action associated with the event data. A first communication between the multimodal communication server and/or a first telephonic device of the recipient may be initiated. The text message and/or the stored multimedia data may be generated when the recipient the first communication to the first telephonic device of the recipient is unanswered. A second communication between the multimodal communication server and/or a second telephonic device of the sender may be initiated when the recipient answers the first communication between the multimodal communication server and/or the first telephonic device. The first communication and/or the second communication may be bridged to enable the recipient to communicate with the sender when both the recipient and/or the sender are communicatively coupled with the multimodal communication server through the first communication and/or the second communication respectively. A financial payment to the mailing center and/or the sender may be automatically initiated based on the response action associated with the event data.

Additional information from the recipient may be requested based on the response action associated with the event data when the item in transit between the source and/or the destination is scanned at the logistical node between the source location and/or the destination location. Another physical mailing of a different item may be automatically initiated from and/or to any one of the sender, the recipient, the mailing center, a different sender, and/or a different recipient based on the response action associated with the event data when the item in transit between the source and/or the destination is scanned at the logistical node between the source location and/or the destination location.

In another aspect, a system includes a set of intermediate servers at logistical nodes between a source location and a destination location to create a scan data from the item in transit between the source location and the destination location, a network, and a multimodal communication server communicatively coupled with each of the set of intermediate servers of logistical nodes between the source location and the destination location through the network.

The multimodal communication server determines if the event data associated with an item in transit between the source location and the destination location based on the scan data of the logistical node between the source location and the destination location is associated with a response action defined in a matching table by the multimodal communication server using a processor and a memory. In addition, the multimodal communication server automatically initiates the response action when the event data associated with the item in transit between the source location and the destination location based on the scan data of the logistical node between the source location and the destination location is defined in the matching table on the multimodal communication server.

In yet another aspect, a multimodal communication server includes a processor communicatively coupled with a memory, a matching module to determine if an event data associated with the item in transit between the source location and the destination location based on a scan data of the logistical node between the source location and the destination location is associated with a response action defined in a matching table of the multimodal communication server using the processor and the memory, and a response module to automatically initiate the response action when the event data associated with the item in transit between the source location and the destination location based on the scan data of the logistical node between the source location and the destination location is defined in the matching table of the multimodal communication server.

The multimodal communication server may also include an analysis module to process a serial number and/or a destination data from the scan data, to associate a set of items associated with a mailing center based on the serial number and to associate a recipient based on the destination data and/or the serial number. The analysis module may also process an origin data from the scan data and associate a sender based on the origin data and/or the serial number.

The multimodal communication server may also have a modification module to modify the response data based on an action of the mailing center having partitioned access to a record of the matching table associated with the serial number and/or the destination data. The modification module may also modify the response data based on another action of the sender having partitioned access to the record of the matching table associated with the serial number and/or the destination data.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION

Example embodiments, as described below, may be used to provide a method, a system and/or a device of an automatic initiation of a response action when an event associated with an item in transit is based on logistical node scan data. Although the present embodiments have been described with reference to specific example embodiments, it will be evident that various modifications and changes may be made to these embodiments without departing from the broader spirit and scope of the various embodiments.

Figure 1:
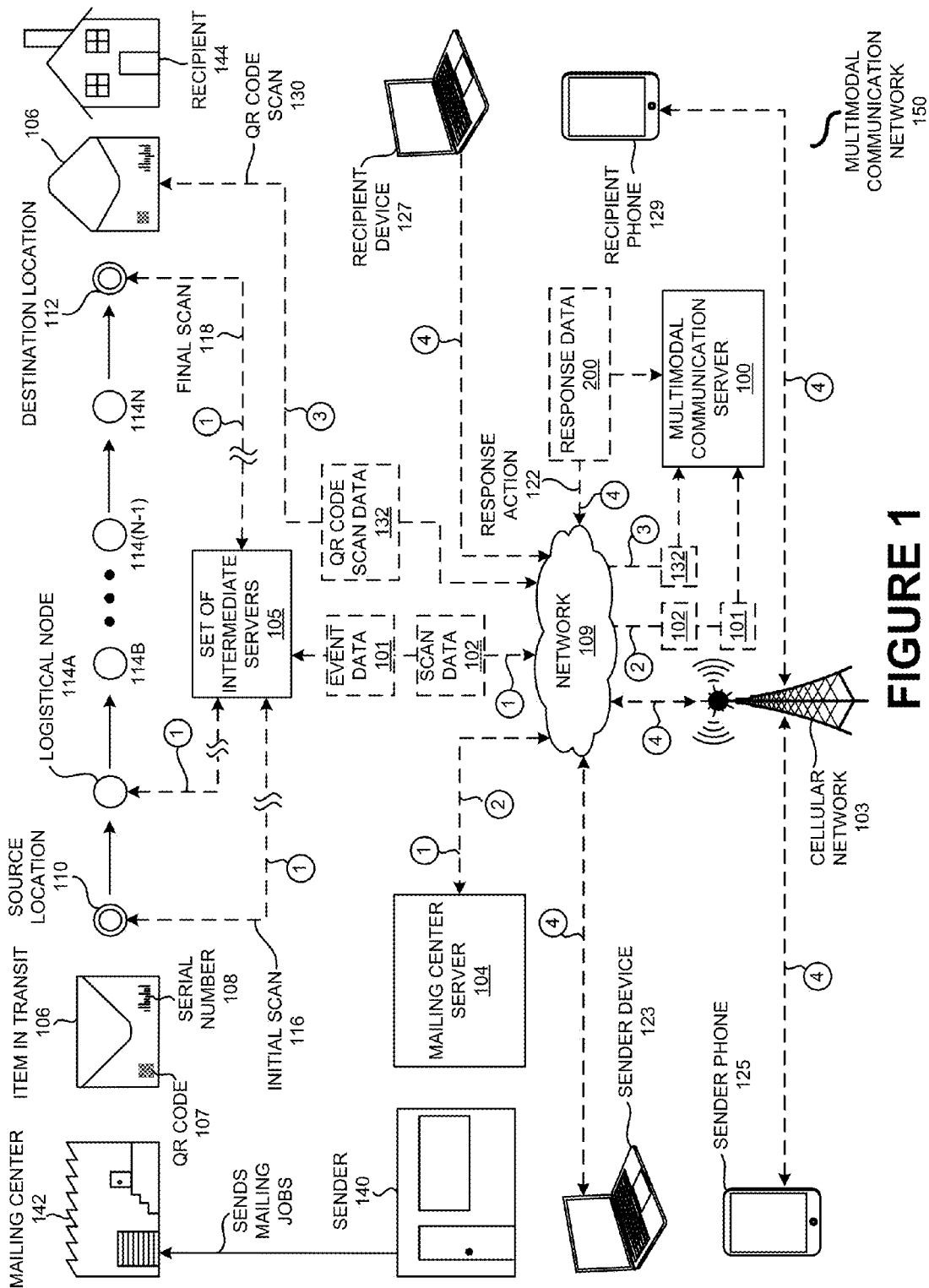
FIG. 1 is a network view of a multimodal communication server initiating a response data sent to a sender or recipient in response to an event data and a scan data generated from the scan of an item in transit as is passes a logistical node.

FIG. 1 is a network view of a multimodal communication server initiating a response data in response to a scan data generated from the scan of an item in transit as is passes a logistical node.

Particularly, FIG. 1 illustrates a multimodal communication network 150, according to one embodiment. The embodiment of FIG. 1 describes a multimodal communication server 100, an event data 101, a scan data 102, a cellular network 103, a mailing center server 104, a set of intermediate servers 105, an item in transit 106, a QR code 107, a serial number 108, a network 109, a source location 110, a destination location 112, a group of logistical nodes 114A through 114N, an initial scan 116, a final scan 118, a response data 200, a response action 122, a sender device 123, a sender phone 125, a recipient device 127, a recipient phone 129, a QR code scan 130, a QR code scan data 132, a sender 140, a mailing center 142, and a recipient 144.

The multimodal communication server 100 may receive the event data 101 and the scan data 102 both generated from the scanning of the serial number 108 on an item in transit 106 as it travels from the source location 110 to the destination location 112 through a series of the logistical nodes 114A through 114N. The item in transit 106 may have been sent by a sender 140 which contracted with a mailing center 142 to send the item to a recipient 144.

The multimodal communication server 100 may provide enriched mechanisms by which the sender 140 communicates with a potential recipient of the item in transit 106. For example, the multimodal communication server 100 may enable the sender 140 to provide higher levels of customer service to the recipient 144 by allowing the sender to contact not only the recipient with updates about their package as it traverses multiple nodes between a sending location and a receiving location, but also communicate with third parties that are affiliated with the transaction. For example, multiple interested parties can be informed when the package arrives at different locations with a distribution supply chain, such that the recipient and interested parties are apprised as to the progress of a shipment. Furthermore, bidirectional communications may automatically be established between the sender, the third parties, and/or the recipient at appropriate times during the transit of the package.

Once generated, the event data 101 and the scan data 102 may move along path circle 1 from scanning equipment at the logistical node 114 to a set of intermediate servers 105 and then to the network 109. The event data 101 and the scan data 102 may then move further along path circle 1, traveling to the mailing center server 104. The scan data 102 may move along circle 2 back to the network 109 to the multimodal communication server 100. Once there, the multimodal communication server may associate the event data 101 and the scan data 102 with the set of instructions to generate response data 200 and initiate response action 122, as described in further detail in FIG. 2 below. Alternately, a QR code scan 130 of a QR code 107 on the item in transit 106 may generate a QR code scan data 132 that moves along circle 3 through the network 109 to the multimodal communication server 100. The QR code scan data 132 may also initiate the response action 122 or a different response action (not shown).

The response data 200 may move along circle 4 through the network 109 to a sender device 123 (e.g. a computer, laptop, tablet, smartphone), a recipient device 127 (e.g. a computer, laptop, tablet, smartphone). The response data 200 may also move along circle 4 through the network 109 to the cellular network 103 to a sender phone 125 or a recipient phone 129. Alternatively, the multimodal communication server 100 may send the response data 200 directly through the cellular network 103 to the sender phone 125 and the recipient phone 129 (not shown).

The sender 140 may be a business that wishes to send mail, postcards or packages to the recipient 144. For example, the sender 140 may be a retail shop (e.g. a local business, a department store chain, a restaurant franchisee), a wholesale establishment (e.g. a office supply company), service provider (e.g. a doctor's office, a dentist office, a hospital, a law firm, an accounting firm), or an internet business (e.g. Amazon.com®, eBay®). The mailing center 142 may be a direct mailing company specializing in direct mail design, direct mail printing, mailing lists, response tracking and bulk mail preparation. The mailing center 142 may be a facility that presorts and the mail items to allow highly automated mail processing, both in bulk and piecewise, in processing facilities that may be referred to as bulk mailing centers (BMCs). For example, the seller may contract with the mailing center 142 with the instruction to send letters to a large number of recipients based on a customer mailing list of the sender 140. The mailing center 142 may also be any business that sends mail or packages on behalf of another or on behalf of itself. Therefore, in one embodiment a sender 140 may be an entity of such a size that it contains its own mailing center 142. For example, Amazon.com® may have an internal mailing center 142.

The recipient 144 may be a business, an individual or group of people at a residential location, an entity (e.g. a corporation, a professional corporation, a partnership, a limited liability company), a common carrier (such as UPS®, FedEx®, DHL®, the United States Postal Service®), a government body or a government agency. It should also be appreciated that in one embodiment the recipient 144 may be any of the types of people or entities that comprise the seller.

The network 109 may be the internet protocol network (IP network), a wide area network, a local area network or a cellular telephone network, or the internet generally. The cellular network 103 may include mobile networks and wireless network cells distributed over land or satellite, each cell served by at least one fixed-location transceiver, known as a cell site or base station.

The mailing center server 104 may be a server that contains a processor and memory. The mailing center server 104 will be discussed in detail in conjunction with FIG. 3.

The item in transit 106 may be sent by the mailing center 142 and may be received by the recipient 144. In one embodiment the item in transit 106 may include a letter, a postcard, or package. In another embodiment, the item in transit 106 may include a pallet, a shipping container, or any other good or raw material. The item in transit 106 may also include a perishable item (e.g. fruit, shellfish packed in dry ice), plants (e.g. a bouquet of flowers) or chemicals. Further, the item in transit 106 may include medical product such as vaccines, organs or tissues for transplant, or any other time-sensitive medical items (e.g. a radioactive contrast dye with a short half-life).

The serial number 108 may be a unique code (e.g. a unique identifier) assigned for identification of a single unit. Although called a number, the serial number 108 may include letters and symbols, including characters from any language such as Chinese or Russian. In one embodiment, the serial number 108 may be unique only for a temporary time period enough for the item in transit 106 to be conveyed form the source location 110 to the destination location 112. For example, the unique portion of the serial number 108 applied by the mailing center 142 may be re-used after a set period of time (e.g. three days, forty-five days, one year) to be applied a new item in transit 106. Therefore, in one embodiment, the non-uniqueness of the serial number 108 with respect to a long period of time does not disrupt identification of the item in transit 106 because the serial number 108 is unique within the relatively short period in which it is in transit.

The serial number 108 may be a manufacturer's serial number (MSN) or may be a QR code that is the same or similar to the QR code 107. The serial number 108 may also be a barcode or other optical machine-readable representation of data relating to the object to which it is attached. For example, the serial number 108 may be a tracking number assigned by a common carrier (e.g. UPS®, FedEx®, DHL®). Further, the serial number 108 may be in a form readable other than by optical equipment scanning equipment. For example the serial number 108 may be contained in a radio-frequency identification (RFID) tag and scanned using radio waves.

In one embodiment, the serial number 108 may be an Intelligent Mail® Barcode (IMb) or Intelligent Mail® Package Barcode (IMpb) used by the United States Postal Service (USPS®). For example, the IMb may contain a number of digits translated into bars that are easily optically scanned. The digits may be a tracking code containing information about a service type purchased from the USPS (e.g. overnight mail, ordinary first-class mail), a mailer identification (e.g. the sender 140 or mailing center 142), a mailer serial number identification (e.g. a unique number applied to the item in transit 106 by the sender 140 or the mailing center 142 to distinguish it from any other mail piece within a set time period), and/or a delivery point zip code (e.g. a 5, 9 or 11 digit routing number). The serial number may be such that a serial number utilized for the item in transit 106 may not be used for any other mail pieces for a period of 45 days.

The QR code 107 may be a quick response code or any other 2D barcode. The QR code 107 may be a matrix barcode that uses one or two-dimensions to represent information. The QR code 107 may be affixed to the packaging (e.g. the exterior of an envelope, the exterior of a box) of the item in transit 106 or contained within. The QR code scan 130, may be conducted by an employee of the carrier service or may be The scan data 102 may include any information that may be contained within the serial number 108. Further, the scan data 102 may include information added by the scanning equipment at the logistical node 114 or information generated by the intermediate servers 105 attached to the logistical nodes 114A through 114N. For example, the scan data 102 may include a destination data (e.g. the intended destination or path of the item in transit 106), an origin data (e.g. the location the item in transit 106 was sent from or the time of mailing). The scan data 102 may also include information about the type of logistical node 114 that generated the scan data 102, including the time and location of the scan.

The scan data 102 may also include information about the item in transit 106 such as the processing status, the type of facility effecting the processing and the type of equipment accomplishing the processing. For example, the scan data 102 may include that information that the item in transit 106 has been processed in Charlotte, N.C. at a USPS® sectional center facility (SCF) by a particular kind of automated mail sorting equipment. The scan data 102 and its components is further discussed in conjunction with FIG. 3.

The QR code scan data 132 may be any information or data included in the scan data 102. It may also include information generated by the scanning device (e.g. the cell phone of the recipient, a specialized scanner employed by businesses) such as the time, date and/or geospatial location of the QR code scan 130. The QR code 107 may include QR code scan data 132 that comprises a secure protocol (e.g., https URL) or a unique web page.

The group of logistical nodes 114A through 114N may be physical locations where the item in transit 106 must pass through on its path from the source location 110 to the destination location 112. In other words, in one embodiment the logistical nodes 114 may be a point at which pathways intersect or branch within the management of the flow of the item in transit 106 between the point of origin and the point of receipt. The logistical nodes 114 may occur at mail processing facilities, on route between processing facilities (e.g. as the item in transit 106 is being loaded onto a truck or plane to be shipped to a different processing facility), or on local mail delivery trucks (e.g. as the item in transit 106 is going out for delivery). Specifically, in one embodiment, the logistical nodes 114 include USPS® DSCF, DNDC, DADC, and DDU processing facilities. In an alternative embodiment, the logistical nodes 114 may include peripheral nodes occurring just after the item in transit 106 inters the logistical stream or just before the item in transit 106 leaves the logistical stream.

The set of intermediate servers 105 may be associated with one or more logistical nodes 114. In one embodiment, one or more intermediate servers 105 are communicatively coupled to one or more logistical nodes 114. The intermediate servers 105 may temporarily store or participate in generating the event data 101 and the scan data 102 before exporting or exporting the event data 101 and scan data 102 to the network 109. The file within the set of intermediate servers 105 may be uploaded through the network 109 to the Mailing Center Server 104 as a File Transfer Protocol file (FTP file).

In one embodiment, the source location 110 may be any location at or near where the item in transit 106 enters a logistical steam to travel to the recipient 144. For example, the source location may be an unattended mailbox where the item in transit 106 is deposited, a physical location where agents of the mailing center 142 hand mail to an attended at a counter, or an initial piece of processing equipment associated with the first logistical node 114 encountered by the item in transit 106. An initial scan 116 of the QR code 107 or the serial number 108 may take place at or near the source location 110 to generate the event data 101 and/or the scan data 102.

A destination location 112 may be any location at or near the location that the recipient 144 is to take possession of the item in transit 106. For example, the destination location 112 may be a residential mailbox, an office mailbox, a post office box (P.O. Box) and a mail receipt facility (e.g. for a large company, a college campus, government agency). A final scan 118 of the QR code 107 or the serial number 108 may take place at or near the destination location 112 to generate the scan data 102. For example, the final scan 118 may occur at a logistical node 114 near the end of the logistical chain or when an agent of the carrier scans the QR code 107 or the serial number 108 when the item in transit 106 is out for delivery or is in the process of transfer to possession and/or custody of the recipient 144. Further, the final scan 118 may be accomplished by the recipient 144, for example by scanning the QR code 107 with the recipient device 127 or the recipient phone 129. In an alternative embodiment, the final scan 118 may be an out-for-delivery scan.

The response action 122 may convey the response data 200 to the sender 140, the mailing center 142, the recipient 144 or additional parties (not shown in FIG. 1). The response action 122 and the response data 200 are described in further detail in conjunction with the description of FIG. 2, below.

The sender device 123 and the recipient device 127 may be any device capable of receiving through the network 109 a multimedia message, text message, email communication, phone call, or any other form of electronic communication. For example, the sender device may be a computer, a tablet or a smartphone. The sender phone 125 and the recipient phone 129 may be any device communicatively coupled to the cellular network 103, for example cellular phones, pagers, or smartphones.

In another embodiment, the item in transit 106 may contain an envelope or box that has a different serial number and/or QR code printed on it. When the recipient places the return envelope back into the logistical steam (e.g. sends it back to the sender, sends it to another person), new scan data are generated to initiate new response data.

Figure 2:
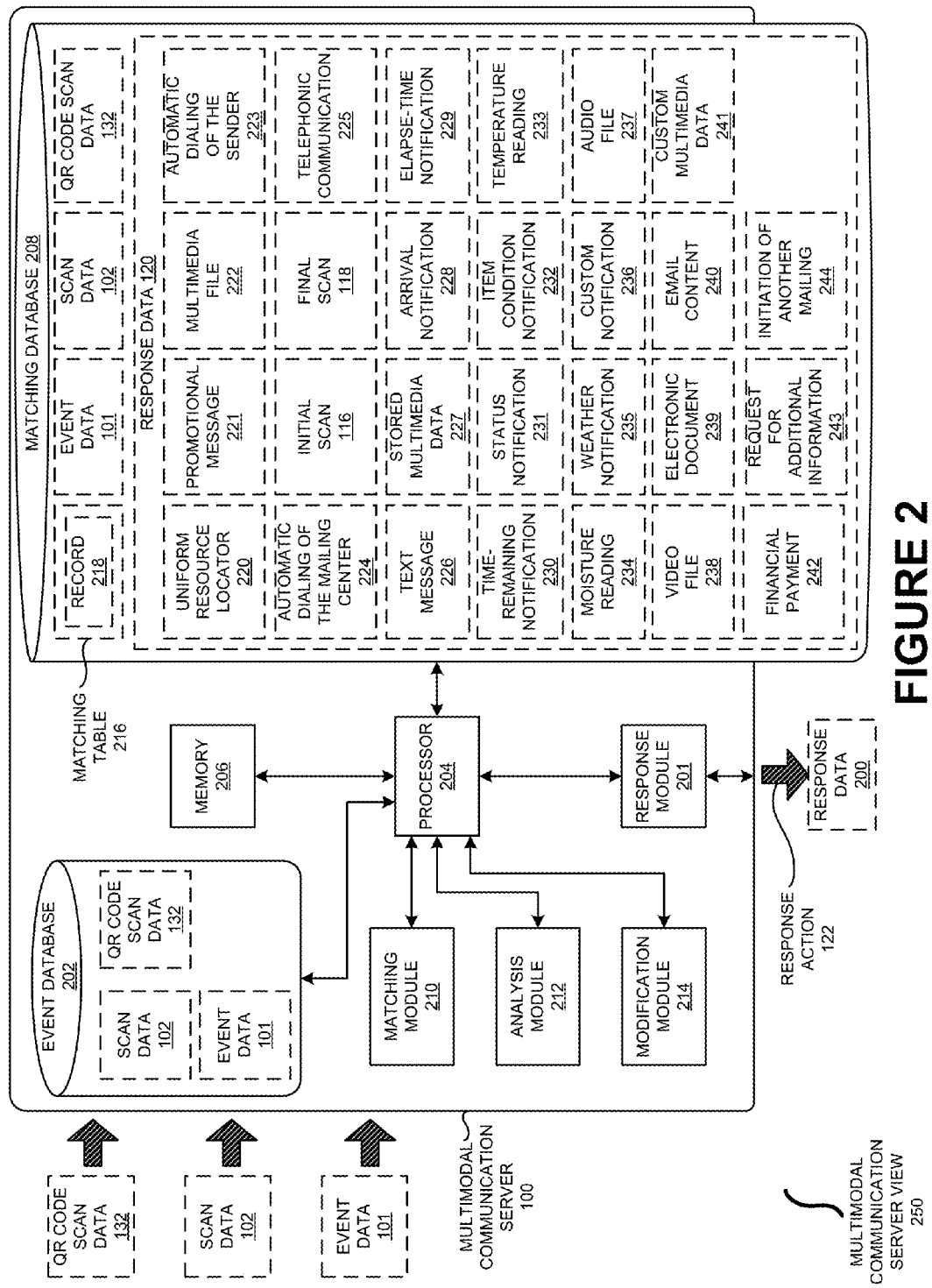
FIG. 2 is an exploded view of the multimodal communication server of FIG. 1 that generates the response data as a reaction to receipt of the scan data and event data, according to one embodiment.

FIG. 2 is an exploded view of the multimodal communication server of FIG. 1 that generates the response data as a reaction to receipt of the scan data and event data, according to one embodiment.

Particularly, FIG. 2 illustrates a multimodal communication server view 250, according to one embodiment. The embodiment of FIG. 2 further describes a response module 201, an event database 202, a processor 204, a memory 206, a matching database 208, a matching module 210, an analysis module 212, a modification module 214, a matching table 216, a record 218, a uniform resource locator (URL) 220, a promotional message 221, a multimedia file 222, an automatic dialing of the sender 223, an automatic dialing of the mailing center 224, a telephonic communication 225, a text message 226, a stored multimedia data 227, an arrival notification 228, an elapse-time notification 229, a time-remaining notification 230, a status notification 231, an item condition notification 232, a temperature notification 233, a moisture reading 234, a weather notification 235, a custom notification 236, an audio file 237, a video file 238, an electronic document 239, an email content 240, a custom multimedia data 241, a financial payment 242, a request for additional information 243, and an initiating of another physical mailing 244.

In FIG. 2, in one embodiment, the event data 101, scan data 102, and/or the QR Code scan data 132 enter an event database 202 within the multimodal communication server 100. The multimodal communication server 100 may include a processor 204 and a memory 206. In one embodiment, the event data 101 and the scan data 102 may be compared to a record contained in a matching table 216 by a matching module 210. The matching table may be stored in a matching database 208. A response module 201 may then generate the appropriate response action 122 by sending a response data 200.

In one embodiment, the matching module 210 compares the serial number 108 of the scan data 102 with the record 118 in the matching table 216. If a record correlating with the serial number 108 is present, the response module 201 may generate the response action 122 associated with record 218, sending the response data 200 to the sender 140, mailing center 142, recipient 144, or any other additional party, based on the receiver(s) specified in the record 218. In one embodiment, then, the matching module 210 and the response module 201 may allow the event data 101 and/or the scan data 102 generated by a logistical sequence to trigger the conveyance of the response data 200 to a person, business or entity specified in the record 218 of the matching table 216.

The response data 200 may contain many elements. The response data 200 may include a uniform resource locator 220 directed to a website or other location on the internet. In another embodiment, the response data 200 may include a promotional message send through a variety of means (e.g. text message, email, a prerecorded phone call). The response data 200 may also include a multimedia file 222 that may use a combination of different content forms including a combination of text, audio, still images, animation, video, or interactivity content forms. The response data 200 may also be the automatic dialing of the sender 223 or the automatic dialing of the mailing center 224, for example to inform either that the item in transit 106 has reached a certain logistical node 114. The response data 200 may also be the data associated with an initial scan 116 or a final scan 118. For example, in one embodiment a response data may be to report to the recipient 144 the scan data 102 from an initial scan 116 so that the recipient 144 may know that the item in transit 106 has been placed in the mail.

The response data 200 may also be a telephonic communication 225 to the sender 140, the mailing center 142, recipient 144 or another person or entity. For example, the telephonic communication 225 may be a prerecorded audio message that is communicated through the cellular network 103 to a sender phone 125 or a recipient phone 129. In an alternate embodiment, the response data 200 may be a text message 126. The text message 126 may, for example, include information contained in the event data 101 or the scan data 102 of the item in transit 106 such as the serial number 108, or the location of the last encountered logistical node 114. The response data 200 may also be a stored multimedia data 227. The stored multimedia data may include a combination of different content forms or digital file formats including a combination of text, audio, pictures, animation, video, or interactivity content forms. The notification data 120 may also contain the arrival notification 228. For example, in one embodiment the notification data 120 may send a notification that a package has arrived on the doorstep of the recipient 144, or that a letter has been arrived at the final mail processing facility before it will be hand-delivered by a mailman or mailwoman.

The notification data 120 may also contain the elapse-time notification 229 that may, for example, be the amount of time an item in transit 106 has been in transit. In yet another embodiment, the notification data 120 may be the time-remaining notification 230. For example, the time-remaining notification 230 may estimate the amount of time before the item in transit 106 will reach the recipient 144 based on which logistical node 114 was last encountered by the item in transit 106.

The notification data 120 may also include, generally, the status notification 231. The status notification 231 may include any of the information contained in the event data 101, the scan data 102, the matching table 216, or another type of response data 200 (e.g. a time-remaining notification). The notification data 120 may also include an item condition notification 232. The item condition notification 232 may describe, for example, whether the item in transit 106 has been lost or damaged.

An alternative embodiment, the notification data 120 may include the temperature reading 233 and/or the moisture reading 234. For example, the event data 101 may include a temperature and/or moisture reading of the environment of the item in transit 106 that may be incorporated into the notification data 120. In another embodiment, the event data 101 may include a temperature and/or moisture reading of the interior of the item in transit 106 where a device that communicates the interior temperature and/or moisture reading to scanning equipment has been incorporated into the item in transit 106. In yet another embodiment, the temperature reading 234 may be incorporated into the notification data 120 from the scan of the event data 101 and/or the scan data 102 where a piece of processing equipment has measured the temperature of the item in transit with infrared radiation (IR).

In another embodiment, the notification data 120 may include the weather notification 235 that relays the weather, temperature, cloud cover, snow depth, ice conditions, precipitation, wind speed, extreme weather warnings, or additional meteorological information. The weather notification 235 may relay weather information about the location of the item in transit 106, the location of an upcoming logistical node 114, and/or the destination location 112. For example, if a kidney for medical transplant is to be delivered as the item in transit 106 to a destination location 112 lacking in refrigeration, the scan of the item in transit 106 at a penultimate logistical node 114 may trigger a response data 200 bearing the temperature and cloud cover at the destination location 112 to help inform the recipient 144 of the urgency of picking up the kidney before it spoils.

The notification data 120 may also include the custom notification 236. For example, in one embodiment the notification data 120 may include an email or text message stating "thank you for shopping at Amazon.com®. Your purchase will arrive soon." The sender and/or the mailing center may set these custom messages by interacting with the multimodal communication server as described in FIG. 5. The notification data 120 may also include the audio file 237, which may, for example, speak the custom notification data 120 to the receiver of the notification data 120. In another embodiment, the notification data 120 may include the video file. For example, the notification data 120, in conjunction with the seller 140 who shipped a good to the recipient 144, may include a video that explains the return policy of a seller 140 or a pre-recorded thank you video message from the CEO of the seller 140.

The response data 200 may also be the electronic document 239, in another embodiment. The electronic document 239 may be in any format (e.g. .pdf, .doc, .txt) and may include any electronic media content that is intended to be used in either an electronic form or as printed output. For example, the response data 200 may include a portable document format (PDF) file with a receipt or instructions on how to operate a computer that is being shipped to the recipient 144.

In another embodiment, the response data 200 may include the email content 240, for example text, attachments, and/or pictures. The response data 200 may also include the custom multimedia data 241 that may include tailored, unique or prerecorded multimedia files and/or content.

In still another embodiment, the response data 200 may be the financial payment 242. The financial payment 242 may directed toward a party other than the sender 140, the mailing center 142 or the recipient 144. For example, the financial payment 242 may be instructions a financial institution to issue a payment to from one party (e.g. the recipient 144) to another party (e.g. the sender 140). In yet another embodiment, the financial payment 242 may be instructions for an escrow to release the funds or other property held in escrow to a party.

The response data 200 may also be the request for additional information 243. The request for additional information 243 may be a request for a party, such as the recipient 144, to provide information to another party, such as the sender 140.

The response data 200 may also be the initiating of another physical mailing 244 from the mailing center 142 or another location. For example, the sender 140 may set up a system of payment to the recipient 144 such a series check or money order is mailed after a first check or money order passes a predetermined logistical node 114.

It should be appreciated that in one embodiment the notification data 120 may include a combination of the above-mentioned embodiments of the notification data 120. For example, in one embodiment the notification data 120 may include an email content 240 that is a multimedia file 222 combining the text of the email with an audio file 237 attachment that speaks a promotional message 221.

Figure 3:
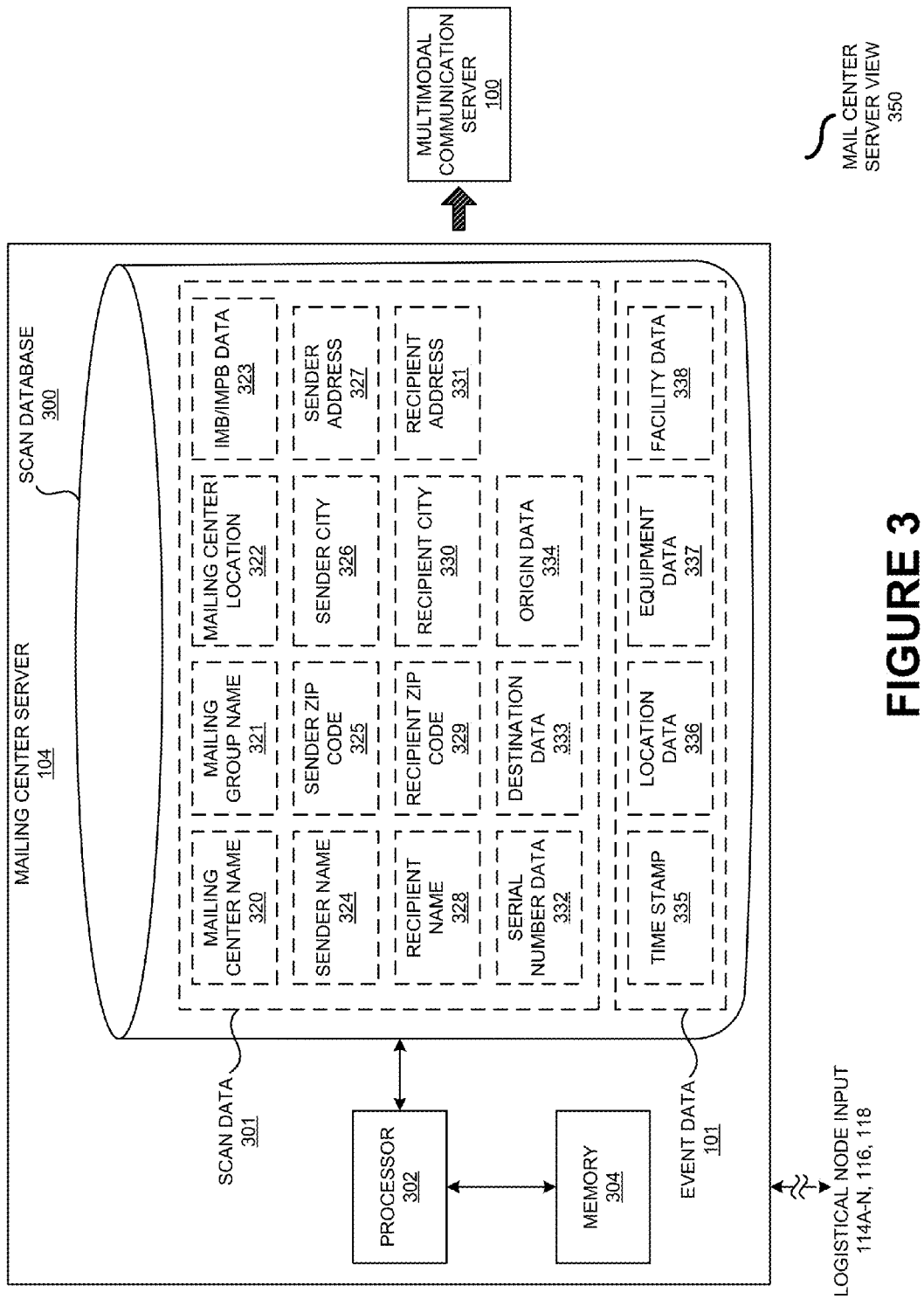
FIG. 3 is an exploded view of both mailing center server of FIG. 1 that temporarily houses the scan data, as well as an exploded view of some of the scan data's individual components, according to one embodiment.

FIG. 3 is an exploded view of both mailing center server of FIG. 1 (that temporarily houses the scan data) as well as some of the scan data's individual components, according to one embodiment.

Particularly, FIG. 3 illustrates an exploded view of a mail center server 350 along with some of the individual components of the scan data according to one embodiment. The embodiment of FIG. 3 further describes a scan database 300, a processor 302, a memory 304, a mailing center name 320, a mailing group name 321, a mailing center location 322, an IMb/IMpb data 323, a sender name 324, a sender zip code 325, a sender city 326, a sender address 327, a recipient name 328, a recipient zip code 329, a recipient city 330, a recipient address 331, a serial number data 332, a destination data 333, an origin data 334, and time stamp 335, a location data 336, an equipment data 337 and a facility data 338.

In one embodiment, the mailing center server 104 may include the scan database 300 communicatively coupled with the processor 302 and the memory 304. The scan database may house the event data 101 and the scan data 102 that are generated through scans of the logistical nodes 114 and/or the initial scan 116 and/or the final scan 118. The mailing center server 104 may be associated with the mailing center 142. In an alternate embodiment, the multimodal communication server 100 may be owned or operated by the mailing center 142, the recipient 144, a government agency (e.g. the post office) or another person or entity. The scan data 102 and the event data 101 may be accessed by and/or withdrawn from the scan database 300 by the multimodal communication server 100 (e.g. by a FTP upload).

The scan data 102 may include the mailing center name 320 and/or the mailing center location 322 of the mailing center that send the item in transit 106. The scan data 102 may also include the mailing group name 321. For example, the mailing group name 321 may include the type of mail communication the item in transit 106 belongs to or is associated with.

The scan data 102 may also include the sender name 324, the sender zip code 325, the sender city 326 and/or the sender address 327. In another embodiment, the scan data 102 may also include the recipient name 328, the recipient zip code 329, the recipient city 330 and/or the recipient address 331. The sender zip code 325 and the recipient zip code 329 may be any code that designates a geospatial region. In one embodiment, the sender zip code 325 and the recipient zip code 329 are USPS® Zip+4 zip codes. The sender name 324 and/or the recipient name 328 may include any additional codes used to identify the sender or recipient respectively.

The scan data 102 may also include the serial number data 332. The serial number data may include any information contained in the serial number 108. The scan data 102 may also include the destination data 333, for example the intended destination of the item in transit 106. The scan data 102 may include an origin data 334 that may include the source location 110, the location of the sender 140, or the location of the mailing center 142.

The event data 101 may include the time stamp 335 of the time and/or date at which the scan occurred or the scan data 102 and/or the event data 101 was generated. In addition, the event data 101 may include the location data 336 which may include the location of the last logistical node 114 the item in transit 106 encountered or all previous logistical nodes 114 that the item in transit 106 encountered.

In another embodiment, the event data 101 includes the equipment data 337 which may be the information associated with the type of automatic or manual sorting equipment employed at the logistical node 114. In another embodiment, the event data 101 may include the facility data 338 that may specify the type of facility (e.g. regional distribution center, local post office) that the item in transit 106 was scanned at.

Figure 4:
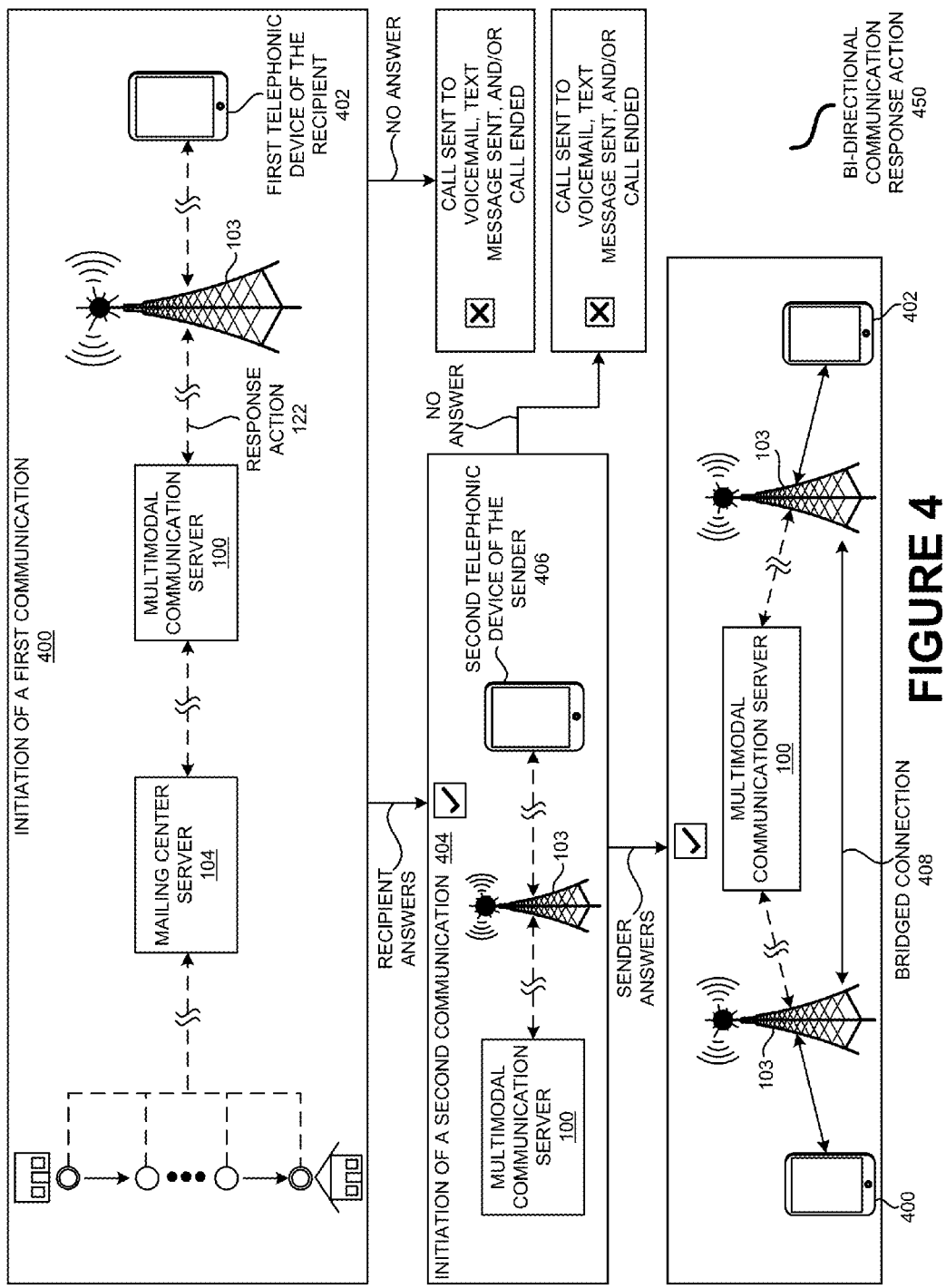
FIG. 4 is a bidirectional communication response action view that, in response to a scan data, shows the multimodal communication server of FIG. 2 initializing a first telephone call to a recipient, a second telephone call to a sender, and then bridging the connection to create a bi-directional communication between the recipient and sender, according to one embodiment.

FIG. 4 is a bidirectional communication response action view that, in response to a scan data, shows the multimodal communication server of FIG. 2 initializing a first telephone call to a recipient, a second telephone call to a sender, and then bridging the connection to create a bi-directional communication between the recipient and sender.

Particularly, FIG. 4 illustrates a bi-directional communication response action 450 of the multimodal communication server 100. The embodiment of FIG. 4 further describes an initiation of a first communication 400, a first telephonic device of the recipient 402, initiation of a second communication 404, a second telephonic device of the sender 406, and a bridged connection 408.

In one embodiment, the multimodal communication server 100 initiates the first communication 400 through the cellular network 103 to the first telephonic device of the recipient 402 as the response action 122. If the recipient's telephonic device does not answer, a different response action 122 or response data 200 may be triggered, for example the sending of a text message informing the recipient 144 to get in touch with the sender 140.

If the recipient 144 does answer, the multimodal communication server 100 may initiate the second communication 404 through the cellular network 103 to the second telephonic device of the sender 406. In one embodiment, if the sender does not answer, the recipient 144 may be send to the voicemail of the sender 140, the call may be ended, or a different response action 122 may be triggered. In addition, in one embodiment, the recipient 144 faced with an unanswered call may have the second telephonic device of the sender 406 re-routed to another location or party.

In one embodiment, if the sender 140 answers the second communication 404 to the second telephonic device of the sender 406, then the multimodal communication server may form the bridged connection 408 such that the sender 140 and the recipient 144 may share a telephone call.

It will be appreciated that other live communications may be formed according to the procedure of FIG. 4, for example initiating a Skype® or FaceTime® communication or a live chat. The first communication 400 and the second communication 404 may also be accomplished through the network 109 (e.g. the IP network). In another embodiment, the first communication 400 goes to the sender 140 and the second communication 404 goes to the recipient 144.

Figure 5:
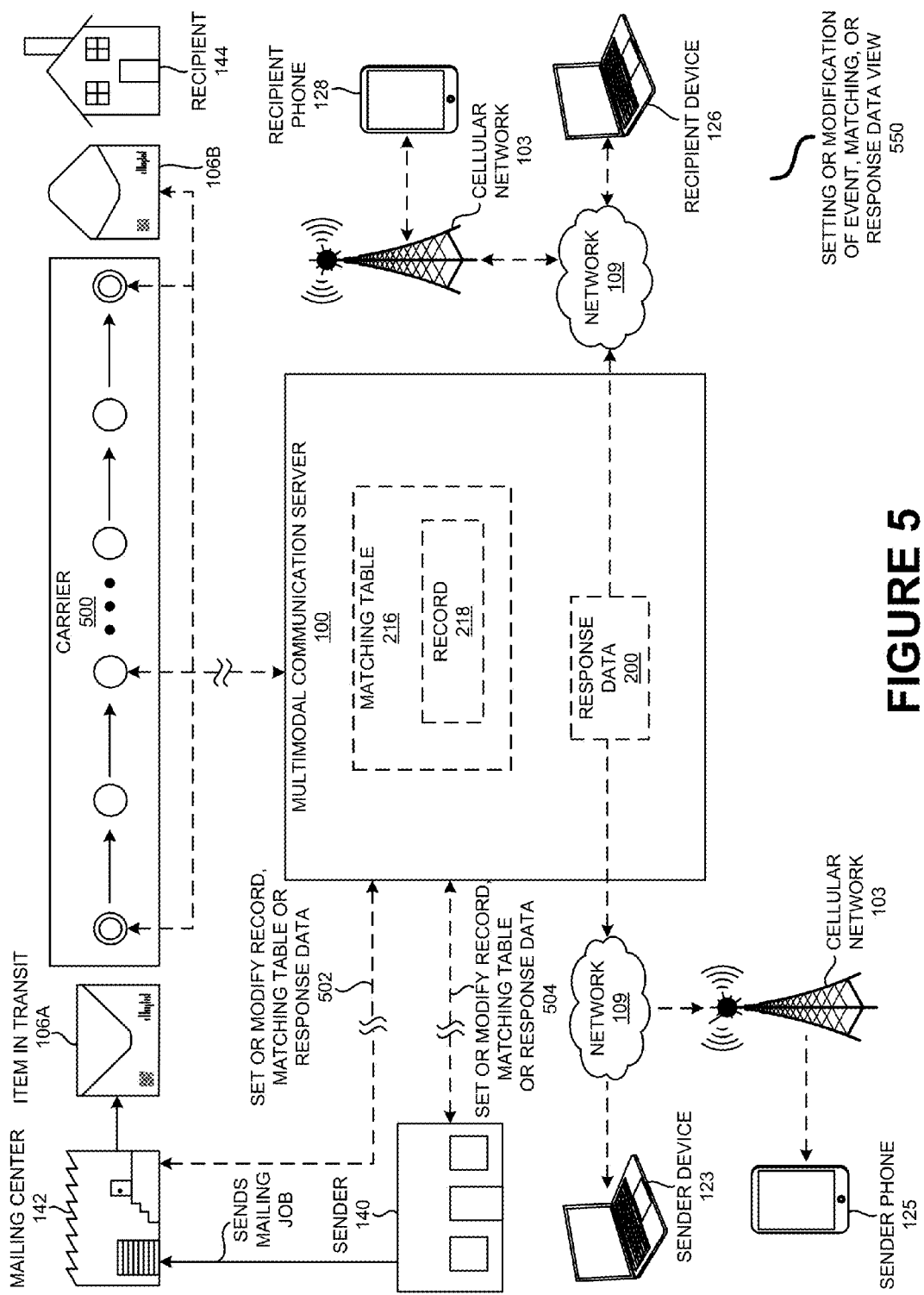
FIG. 5 is a view showing the setting or modification of event, matching or response data by the sender and/or mailing center of FIG. 1 within the multimodal communication server of FIG. 2, according to one embodiment.

FIG. 5 is a view showing the setting or modification of event, matching or response data by the sender and/or mailing center of FIG. 1 within the multimodal communication server of FIG. 2, according to one embodiment. Particularly FIG. 5 illustrates a setting or modification of event, matching, or response data view 550. In FIG. 5, the mailing center 142 may set or modify record, matching table, and/or response data associated with the record 218 of the multimodal communication server 100, as described in operation 502. Similarly, the sender 140 may set or modify record, matching table, or response data in operation 504. A wide range of heterogeneous ones of the carrier 500 may interact with the multimodal communication server 100. For example, the carrier 500 may be different providers such as United Postal Service®, United States Postal Service®, and/or Federal Express®. The primary concept described in FIG. 5 is that the sender 140 and/or the mailing center 142 can modify the record 218 even when the item in transit 106 has departed an origin. As such, the response data 200 can be modified in response to a mailing of the item in transit based on a business requirement.

Figure 6:
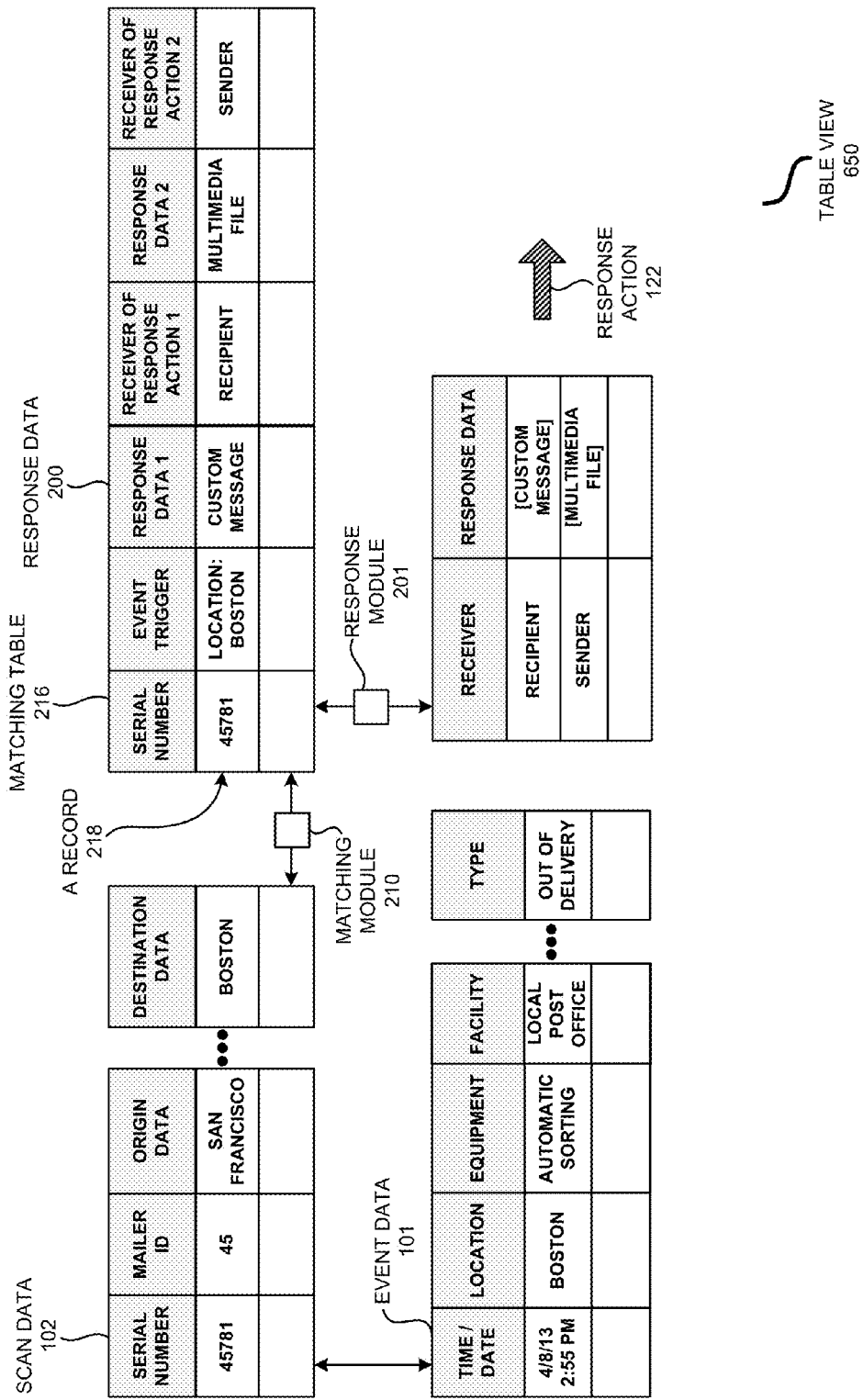
FIG. 6 is a view showing the scan data of FIG. 3, the event data of and matching table of FIG. 2 in table form generating the response data of within the multimodal communication server, according to one embodiment.

FIG. 6 illustrates a table view 650 in which the matching module 210 and the response module are used to generate the response action 122 based on an event data 101 associated with a scan data 102, according to one embodiment. In the scan data 102 and the event data 101 is compared in the matching table 216 in FIG. 6. Based on a match, the response module 200 communicates an appropriate response action 122 based on a response data 200, according to one embodiment.

Figure 7:
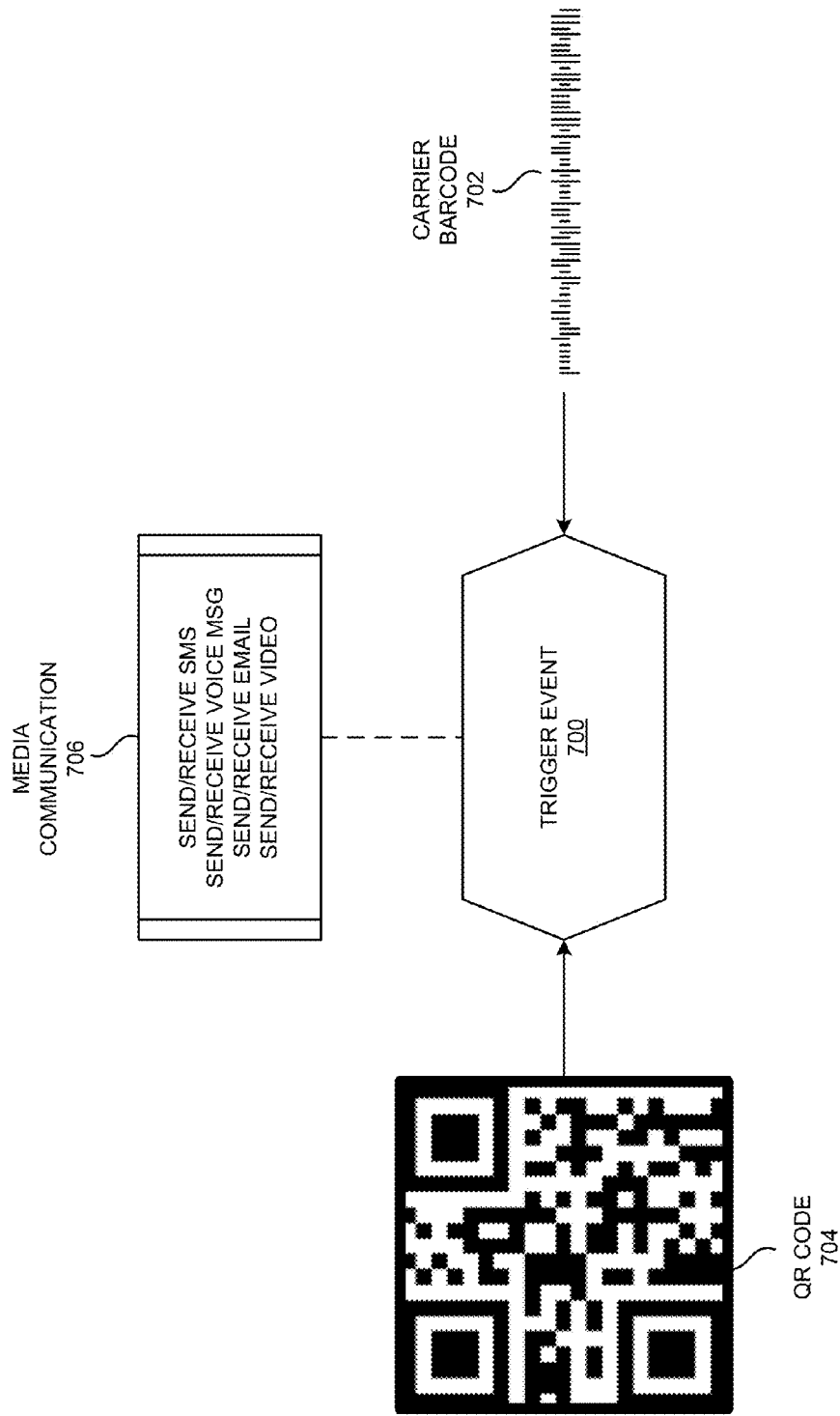
FIG. 7 is a view illustrating a concept in which a trigger event is initiated based on a scan of either a carrier barcode and/or a reading of a qr code that is physically placed on the item in transit to create a media communication, according to one embodiment.

FIG. 7 illustrates a concept in which a trigger event 700 (e.g., event data 101, the initial scan 116, the qr code scan 130, the final scan 118, and/or any intermediate scan) is initiated based on a scan of either a carrier barcode 702 (e.g., the serial number 108 on the item in transit 106) and/or a reading of a qr code 704 (e.g., physically placed on the item in transit 106) to create a media communication 706. The media communication 706 may be the response action 122 as previously described. The media communication may any one or more of a sending and/or a receiving of a short text message, a voice message, an email, and a video communication, according to one embodiment.

A system initiates a response action 122 when an event data 101 associated with an item in transit 106 between a source location 110 and a destination location 112 based on a scan data 102 of a logistical node 114 between the source location 110 and the destination location 112 is defined in a matching table 216 of a multimodal communication server 100.

A method of a multimodal communication server 100 includes processing an event data 101 associated with an item in transit 106 between a source location 110 and a destination location 112 based on a scan data 102 of a logistical node 114 between the source location 110 and the destination location 112. The method determines if the event data 101 associated with the item in transit 106 between the source location 110 and the destination location 112 based on the scan data 102 of the logistical node 114 between the source location 110 and the destination location 112 is associated with a response action 122 defined in a matching table 216 by the multimodal communication server 100 using a processor 204 and a memory 206. In addition, the method automatically initiates the response action 122 when the event data 101 associated with the item in transit 106 between the source location 110 and the destination location 112 based on the scan data 102 of the logistical node 114 between the source location 110 and the destination location 112 is defined in the matching table 216 on the multimodal communication server 100.

A method of a multimodal communication server 100 may process a serial number 108 and/or a destination data from the scan data 102. A set of items of a mailing center 142 may be associated based on the serial number 108. A recipient 144 may be associated based on the destination data and/or the serial number 108. A response data 200 may be modified based on an action of the mailing center 142 having partitioned access to a record 218 of the matching table 216 associated with the serial number 108 and/or the destination data. An origin data \ may be processed from the scan data 102. A sender 140 may be associated based on the origin data and/or the serial number 108. The response data 200 may be modified based on another action of the sender 140 having partitioned access to the record 218 of the matching table 216 associated with the serial number 108 and/or the destination data 333.

The serial number 108 may identify a mailing center 142 name, a mailing group name 321, a mailing center 142 location, and/or a time stamp of the item in transit 106. The origin data may identify a sender name 324, a sender zip code 325, a sender city 326, and/or a sender address 327. The destination data may identify a recipient name 328, a recipient zip code 329, a recipient city 330, and/or a recipient address 331. The item in transit 106 may include a Quick Response (QR) qr code 107 printed on a packaging of the item in transit 106 that is automatically associated with a different response action, wherein the different response action is a uniform resource locator (URL) address associated with a promotional message 221, a multimedia file 222, an automatic dialing of the sender 223, and/or an automatic dialing of the mailing center 224.

The scan data 102 of the logistical node 114 between the source location 110 and/or the destination location 112 may include an initial scan 116 at the source location 110 and/or a final scan 118 at the destination location 112. A telephonic communication 225 may be established between the recipient 144 and/or the sender 140 based on the response action 122 associated with the event data 101. A text message 226 communicated to the recipient 144 on behalf of the mailing center 142 and/or the sender 140 may be generated based on the response action 122 associated with the event data 101. A stored multimedia data 227 may be communicated to the recipient 144, the sender 140, and/or the mailing center 142 based on the response action 122 associated with the event data 101. The text message 226 may be an arrival notification 228, an elapsed-time notification, a time-remaining notification 230, a status notification 231, an item condition notification 232, a temperature notification 233, a moisture reading 234, a weather notification 235, and/or a custom notification 236 generated by the sender and/or the mailing center based on the response action 122 associated with the event data 101.

The stored multimedia data 227 may be an audio file 237, a video file 238, an electronic document 239, email content 240, and/or a custom multimedia data 241 generated by the sender 140 and/or the mailing center 142 based on the response action 122 associated with the event data 101. A first communication 400 between the multimodal communication server 100 and/or a first telephonic device of the recipient 402 may be initiated. The text message 226 and/or the stored multimedia data 227 may be generated when the recipient 144 the first communication 400 to the first telephonic device of the recipient 402 is unanswered. A second communication 404 between the multimodal communication server 100 and/or a second telephonic device of the sender 140 may be initiated when the recipient 144 answers the first communication 400 between the multimodal communication server 100 and/or the first telephonic device. The first communication 400 and/or the second communication 404 may be bridged to enable the recipient 144 to communicate with the sender 140 when both the recipient 144 and/or the sender 140 are communicatively coupled with the multimodal communication server 100 through the first communication 400 and/or the second communication 404 respectively. Once connected, the bridged connection 408 may be formed. A financial payment to the mailing center 142 and/or the sender 140 may be automatically initiated based on the response action 122 associated with the event data 101.

Additional information from the recipient 144 may be requested based on the response action 122 associated with the event data 101 when the item in transit 106 between the source location 110 and/or the destination location 112 is scanned at the logistical node 114 between the source location 110 and/or the destination location 112. Another physical mailing of a different item may be automatically initiated from and/or to any one of the sender 140, the recipient 144, the mailing center 142, a different sender, and/or a different recipient based on the response action 122 associated with the event data 101 when the item in transit 106 between the source and/or the destination is scanned at the logistical node 114 between the source location 110 and/or the destination location 112.

A system includes a set of intermediate servers 105 at logistical node 114s between a source location 110 and a destination location 112 to create a scan data 102 from the item in transit 106 between the source location 110 and the destination location 112, a network 109, and a multimodal communication server 100 communicatively coupled with each of the set of intermediate servers 105 of logistical nodes 114 between the source location 110 and the destination location 112 through the network 109.

The multimodal communication server 100, may, according to another embodiment, determine if the event data 101 associated with an item in transit 106 between the source location 110 and the destination location 112 based on the scan data 102 of the logistical node 114 between the source location 110 and the destination location 112 is associated with a response action 122 defined in a matching table 216 by the multimodal communication server 100 using a processor 204 and a memory 206. In addition, the multimodal communication server 100 automatically initiates the response action 122 when the event data 101 associated with the item in transit 106 between the source location 110 and the destination location 112 based on the scan data 102 of the logistical node 114 between the source location 110 and the destination location 112 is defined in the matching table 216 on the multimodal communication server 100.

In yet another aspect, a multimodal communication server 100 includes a processor 204 communicatively coupled with a memory 206, a matching module 210 to determine if an event data 101 associated with the item in transit 106 between the source location 110 and the destination location 112 based on a scan data 102 of the logistical node 114 between the source location 110 and the destination location 112 is associated with a response action 122 defined in a matching table 216 of the multimodal communication server 100 using the processor and the memory 206, and a response module to automatically initiate the response action 122 when the event data 101 associated with the item in transit 106 between the source location 110 and the destination location 112 based on the scan data 102 of the logistical node 114 between the source location 110 and the destination location 112 is defined in the matching table 216 of the multimodal communication server 100.

The multimodal communication server 100 may also include an analysis module 212 to process a serial number 108 and/or a destination data from the scan data 102, to associate a set of items associated with a mailing center 142 based on the serial number 108 and to associate a recipient 144 based on the destination data and/or the serial number 108. The analysis module may also process an origin data from the scan data 102 and associate a sender 140 based on the origin data and/or the serial number 108.

The multimodal communication server 100 may also have a modification module 214 to modify the response data 200 based on an action of the mailing center 142 having partitioned access to a record 218 of the matching table 216 associated with the serial number 108 and/or the destination data. The modification module may also modify the response data 200 based on another action of the sender 140 having partitioned access to the record 218 of the matching table 216 associated with the serial number 108 and/or the destination data.

An item in transit (e.g., a letter, a package, a pallet, a perishable item, a non-perishable item, a medical product) may travel through a system in a controlled manner between a sender (e.g., a seller) and a recipient (e.g., a customer) of the item in transit, using the multimodal communication server 100. For example, the sender may use a mailing center (e.g., a third party logistics provider) to prepare a number of items to be sent to a group of recipients. A carrier (e.g., the United States Postal Service®, United Parcel Service®, FedEx®) may route the item in transit through a series of logistical nodes (e.g., intermediate locations between a location of the sender and a location of the recipient) in a controlled manner such that the multimodal communication server 100 is able to direct a flow of information from the source location 110 and the destination location 112.

As a result, the recipient 144 may be delighted when things they order arrive in a predictable time frame, and the recipient 144 has been apprised of the status of their order through messages from the sender 140 via telephone, email, and/or voice message as the item in transit progressed across each logistical node 114 from the source location 110 to the destination location 112. The sender 140 may be able to track and address any customer service concerns before they become a larger issue. Further, the sender 140 may be able to customize personal confirmation notices associated with the item in transit 106. Therefore, the recipient may be extremely satisfied with the service provided by the sender 140.

The recipient 144 may be able to track a present location of the item in transit by receiving frequent updates from the multimodal communication server 100. The recipient be alerted that the item in transit is to be received. As a result, the recipient 144 is likely to be available to receive the item in transit 106 when it arrives. Therefore, the item in transit 106 may not be lost, damaged (e.g., by encountering bad weather), and/or stolen. Therefore, the sender 140 may gain a valuable opportunity to build a relationship with the recipient as the item in transit 106 moves from the sender 140 to the recipient 144 through the carrier. Therefore, the recipient 144 may develop trust in the sender 140. As a result, valuable current and future revenue opportunities between the sender 140 and the recipient 144 may be possible.

For example, a new FastPro computer sold by an online computer store, Phil's Computers & More, Inc. may travel through multiple cities in a controlled manner. For example, Phil's might ship a computer from Phoenix (e.g., where Phil's is located) to San Francisco, a city in which Phil's customer Janice Hodgkins lives using the multimodal communication server 100. Phil's may tell Janice every time the FastPro computer that she has always been waiting for arrives and/or is sent from an intermediate node in Yuma, Los Angeles, Fresno, and ultimately in San Francisco. Phil's may use different carriers such as (e.g., the United States Postal Service®, United Parcel Service®, FedEx®) and automatically call Janice to give her regular updated on progress of her shipment using the multimodal communication server 100.

As a result, Janice may be delighted when her new FastPro computer arrives in a predictable time frame. Fifteen minutes after receiving her computer, Janice may receive a call from Bob Peters, the customer service manager of Phil's to ask Janice if she has any questions about her computer that she just received. Janice may be surprised and happy that Phil's took the time to call her in such a timely manner. Phil's may automatically call Janice's grandma as well, based on the instructions preset prior to the computer being shipped. Janice may be impressed. Therefore, she may become a loyal customer of Phil's and refer the company to all her friends. All this may be possible through the various embodiments described in FIGS. 1-7, according to one embodiment.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:

1. A method of a multimodal communication server, the multimodal communication server being part of a mailing service, comprising:

processing, through the multimodal communication server, event data associated with a mailed item in transit between a source location and a destination location based on scan data of a logistical node between the source location and the destination location, the source location and the destination location comprising a plurality of logistical nodes therebetween including the logistical node associated with the scan data, the scan data and the event data being generated through a scan of a code on the mailed item in transit at the logistical node by a set of intermediate servers communicatively coupled to the plurality of logistical nodes, and the set of intermediate servers also being communicatively coupled to the multimodal communication server through a computer network;

determining, through the multimodal communication server, if the event data associated with the mailed item in transit between the source location and the destination location is associated with response actions defined in a matching table of the multimodal communication server using a processor and a memory;

in response to the determination of the event data being associated with a time notification as a defined response action:

determining, through the multimodal communication server, the logistical node as a logistical node last encountered by the mailed item in transit;

determining, through the multimodal communication server, an amount of time before the mailed item in transit is expected to reach a recipient thereof in accordance with the determined last encountered logistical node; and transmitting, through the multimodal communication server, data related to the determined amount of time before the mailed item in transit is expected to reach the recipient thereof to a client device of the recipient;

determining, through a device incorporated into the mailed item in transit, a temperature reading of an interior of the mailed item in transit based on infrared radiation;

automatically communicating, through the device incorporated into the mailed item in transit, the determined temperature reading to scanning equipment associated with the scan data of the logistical node between the source location and the destination location;

incorporating, through the multimodal communication server, the communicated temperature reading of the interior of the mailed item in transit into the scan data of the logistical node between the source location and the destination location;

in response to the determination of the event data being associated with a temperature notification as another defined response action:

transmitting, through the multimodal communication server, data related to the determined temperature of the interior of the mailed item in transit to the client device of the recipient; and transmitting, through the multimodal communication server, data related to weather information about a logistical node encountered by the mailed item in transit to the client device of the recipient when the mailed item is a perishable item whose condition is weather-dependent in accordance with the event data being associated with a weather notification as yet another defined response action.

2. The method of the multimodal communication server of claim 1, further comprising:

processing, through the multimodal communication server, a serial number and a destination data from the scan data;

associating, through the multimodal communication server, a set of items associated with a mailing center based on the serial number;

associating, through the multimodal communication server, the recipient based on at least one of the destination data and the serial number; and modifying, through the multimodal communication server, a response data based on an action of the mailing center having partitioned access to a record of the matching table associated with the serial number and the destination data.

3. The method of the multimodal communication server of claim 2, further comprising:

processing, through the multimodal communication server, an origin data from the scan data;

associating, through the multimodal communication server, a sender of the mailed item based on at least one of the origin data and the serial number; and modifying, through the multimodal communication server, the response data based on another action of the sender having partitioned access to the record of the matching table associated with the serial number and the destination data.

4. The method of claim 3, wherein the serial number identifies at least one of a mailing center name, a mailing group name, a mailing center location, and a time stamp of the mailed item, wherein the origin data identifies at least one of a sender name, a sender zip code, a sender city, and a sender address, and wherein the destination data identifies at least one of a recipient name, a recipient zip code, a recipient city, and a recipient address.

5. The method of claim 3, wherein the mailed item in transit includes a Quick Response (QR) code printed on a packaging thereof that is automatically associated with a different response action, wherein the different response action is at least one of a uniform resource locator (URL) address associated with a promotional message, a multimedia file, an automatic dialing of the sender, and an automatic dialing of a mailing center, and wherein the scan data of the logistical node between the source location and the destination location includes an initial scan at the source location and a final scan at the destination location.

6. The method of claim 3, further comprising:

establishing, through the multimodal communication server, a telephonic communication between the recipient and the sender based on a defined response action associated with the event data;

generating, through the multimodal communication server, a text message to be communicated to the recipient on behalf of at least one of a mailing center and the sender based on the defined response action associated with the event data; and communicating, through the multimodal communication server, stored multimedia data to at least one of the recipient, the sender, and the mailing center based on the defined response action associated with the event data,
 wherein the text message is at least one of an arrival notification, an elapsed-time notification, a status notification, an item condition notification, a moisture reading, and a custom notification generated by the at least one of the mailing center and the sender based on the defined response action associated with the event data, and
 wherein the stored multimedia data is at least one of an audio file, a video file, an electronic document, an email content, and a custom multimedia data generated by the at least one of the mailing center and the sender based on the defined response action associated with the event data.

7. The method of claim 6, wherein the establishment of the bidirectional telephonic communication between the recipient and the sender further comprises:
 initiating a first communication between the multimodal communication server and a first telephonic device of the recipient;
 generating at least one of the text message and the stored multimedia data when the recipient is unresponsive to the first communication through the first telephonic device;
 initiating a second communication between the multimodal communication server and a second telephonic device of the sender when the recipient responds to the first communication through the first telephonic device thereof; and
 bridging the first communication and the second communication to enable the recipient to communicate with the sender when both the recipient and the sender are communicatively coupled with the multimodal communication server based on the first communication and the second communication respectively.

8. The method of claim 3, further comprising:
 automatically initiating, through the multimodal communication server, a financial payment to at least one of the mailing center and the sender based on a defined response action associated with the event data;
 requesting, through the multimodal communication server, additional information from the recipient based on the defined response action associated with the event data when the mailed item in transit between the source and the destination is scanned at the logistical node between the source location and the destination location; and
 automatically initiating, through the multimodal communication server, another physical mailing of a different item from and to any one of the sender, the recipient, the mailing center, a different sender and a different recipient based on the defined response action associated with the event data when the mailed item in transit between the source and the destination is scanned at the logistical node between the source location and the destination location.

9. A system, comprising:
 a set of intermediate servers at logistical nodes between a source location and a destination location to create scan data from a mailed item in transit between the source location and the destination location;
 a computer network;
 a multimodal communication server communicatively coupled with the set of intermediate servers through the computer network, the multimodal communication server being part of a mailing service, and the multimodal communication server being configured to:
  process event data associated with the mailed item in transit between the source location and the destination location based on the created scan data, the scan data and the event data being generated through a scan of a code on the mailed item in transit at a logistical node by the set of intermediate servers,
  determine if the event data associated with the mailed item in transit between the source location and the destination location is associated with response actions defined in a matching table of the multimodal communication server using a processor and a memory, and
  in response to the determination of the event data being associated with a time notification as a defined response action:
   determine the logistical node as a logistical node last encountered by the mailed item in transit,
   determine an amount of time before the mailed item in transit is expected to reach a recipient thereof in accordance with the determined last encountered logistical node, and
   transmit data related to the determined amount of time before the mailed item in transit is expected to reach the recipient thereof to a client device of the recipient,
 a device incorporated into the mailed item in transit, the device being configured to determine a temperature reading of an interior of the mailed item in transit based on infrared radiation, and to automatically communicate the determined temperature reading to scanning equipment associated with the scan data of the logistical node between the source location and the destination location,
 wherein the multimodal communication server is further configured to:
  incorporate the communicated temperature reading of the interior of the mailed item in transit into the scan data of the logistical node between the source location and the destination location,
  in response to the determination of the event data being associated with a temperature notification as another defined response action:
   transmit data related to the determined temperature reading of the interior of the mailed item in transit to the client device of the recipient, and
   transmit data related to weather information about a logistical node encountered by the mailed item in transit to the client device of the recipient when the mailed item is a perishable item whose condition is weather-dependent in accordance with the event data being associated with a weather notification as yet another defined response action.

10. The system of claim 9, wherein the multimodal communication server is further configured to:
 process a serial number and a destination data from the scan data,
 associate a set of items associated with a mailing center based on the serial number,
 associate the recipient based on at least one of the destination data and the serial number, and
 modify a response data based on an action of the mailing center having partitioned access to a record of the matching table associated with the serial number and the destination data.

11. The system of claim 10, wherein the multimodal communication server is further configured to:
  process an origin data from the scan data,
  associate a sender of the mailed item based on at least one of the origin data and the serial number, and
  modify the response data based on another action of the sender having partitioned access to the record of the matching table associated with the serial number and the destination data.

12. The system of claim 11,
  wherein the serial number identifies at least one of a mailing center name, a mailing group name, a mailing center location, and a time stamp of the mailed item in transit,
  wherein the origin data identifies at least one of a sender name, a sender zip code, a sender city, and a sender address, and
  wherein the destination data identifies at least one of a recipient name, a recipient zip code, a recipient city, and a recipient address.

13. The system of claim 11,
  wherein the mailed item in transit includes a QR code printed on a packaging thereof that is automatically associated with a different response action, wherein the different response action is at least one of a URL address associated with a promotional message, a multimedia file, an automatic dialing of the sender, and an automatic dialing of a mailing center, and
  wherein the scan data includes an initial scan at the source location and a final scan at the destination location.

14. The system of claim 11, wherein the multimodal communication server is further configured to:
  establish a telephonic communication between the recipient and the sender based on a defined response action associated with the event data,
  generate a text message to be communicated to the recipient on behalf of at least one of a mailing center and the sender based on the defined response action associated with the event data, and
  communicate stored multimedia data to at least one of the recipient, the sender, and the mailing center based on the defined response action associated with the event data,
    wherein the text message is at least one of an arrival notification, an elapsed-time notification, a status notification, an item condition notification, a moisture reading, and a custom notification generated by at least one of the mailing center and the sender based on the defined response action associated with the event data, and
    wherein the stored multimedia data is at least one of an audio file, a video file, an electronic document, an email content, and a custom multimedia data generated by at least one of the mailing center and the sender based on the defined response action associated with the event data.

15. The system of claim 14, wherein the multimodal communication server is further configured to:
  initiate a first communication between the multimodal communication server and a first telephonic device of the recipient,
  generate at least one of the text message and the stored multimedia data when the recipient is unresponsive to the first communication through the first telephonic device,
  initiate a second communication between the multimodal communication server and a second telephonic device of the sender when the recipient responds to the first communication through the first telephonic device thereof, and
  bridge the first communication and the second communication to enable the recipient to communicate with the sender when both the recipient and the sender are communicatively coupled with the multimodal communication server based on the first communication and the second communication respectively.

16. The system of claim 11, wherein the multimodal communication server is further configured to:
  automatically initiate a financial payment to at least one of the mailing center and the sender based on a defined response action associated with the event data,
  request additional information from the recipient based on the defined response action associated with the event data when the mailed item in transit between the source and the destination is scanned, and
  automatically initiate another physical mailing of a different item from and to any one of the sender, the recipient, the mailing center, a different sender, and a different recipient based on the defined response action associated with the event data when the mailed item in transit between the source and the destination is scanned.

17. A multimodal communication server, the multimodal communication server being part of a mailing service, comprising:
  a memory; and
  a processor communicatively coupled to the memory, the processor being configured to execute instructions to:
    process event data associated with a mailed item in transit between a source location and a destination location based on scan data of a logistical node between the source location and the destination location, the source location and the destination location comprising a plurality of logistical nodes therebetween including the logistical node associated with the scan data, the scan data and the event data being generated through a scan of a code on the mailed item in transit at the logistical node by a set of intermediate servers communicatively coupled to the plurality of logistical nodes, and the set of intermediate servers also being communicatively coupled to the multimodal communication server through a computer network,
    determine if the event data associated with the mailed item in transit between the source location and the destination location is associated with response actions defined in a matching table of the multimodal communication server,
    in response to the determination of the event data being associated with a time notification as a defined response action:
      determine the logistical node as a logistical node last encountered by the mailed item in transit,
      determine an amount of time before the mailed item in transit is expected to reach a recipient thereof in accordance with the determined last encountered logistical node, and
      transmit data related to the determined amount of time before the mailed item in transit is expected to reach the recipient thereof to a client device of the recipient, enable determining, through a device incorporated into the mailed item in transit, a temperature reading of an interior of the mailed item in transit based on infrared radiation, enable automatic communication, through the device incorporated into the mailed item in transit, the determined temperature reading to scanning equipment associated with the scan data of the logistical node between the source location and the destination location, incorporate the communicated temperature reading of the interior of the mailed item in transit into the scan data of the logistical node between the source location and the destination location, in response to the determination of the event data being associated with a temperature notification as another defined response action:

transmit data related to the determined temperature reading of the interior of the mailed item in transit to the client device of the recipient, and transmit data related to weather information about a logistical node encountered by the mailed item in transit to the client device of the recipient when the mailed item is a perishable item whose condition is weather-dependent in accordance with the event data being associated with a weather notification as yet another defined response action.

18. The multimodal communication server of claim 17, wherein the processor is further configured to execute instructions to:

process a serial number and a destination data from the scan data, associate a set of items associated with a mailing center based on the serial number, associate the recipient based on at least one of the destination data and the serial number, process an origin data from the scan data, associate a sender of the mailed item based on at least one of the origin data and the serial number, modify a response data based on an action of the mailing center having partitioned access to a record of the matching table associated with the serial number and the destination data, and modify the response data based on another action of the sender having partitioned access to the record of the matching table associated with the serial number and the destination data.

19. The multimodal communication server of claim 18, wherein the serial number identifies at least one of a mailing center name, a mailing group name, a mailing center location, and a time stamp of the mailed item, wherein the origin data identifies at least one of a sender name, a sender zip code, a sender city, and a sender address, and wherein the destination data identifies at least one of a recipient name, a recipient zip code, a recipient city, and a recipient address.

20. The multimodal communication server of claim 18, wherein the mailed item in transit includes a QR code printed on a packaging thereof that is automatically associated with a different response action, wherein the different response action is at least one of a URL address associated with a promotional message, a multimedia file, an automatic dialing of the sender, and an automatic dialing of a mailing center, and wherein the scan data of the logistical node between the source location and the destination location includes an initial scan at the source location and a final scan at the destination location.

* * * * *